United States Patent
Meeker et al.

(10) Patent No.: US 7,564,462 B2
(45) Date of Patent: Jul. 21, 2009

(54) METHOD AND APPARATUS FOR READING AND WRITING PIXEL-ALIGNED SUBFRAMES IN A FRAME BUFFER

(75) Inventors: Woodrow L. Meeker, Orlando, FL (US); Clara Ka Wah Sung, Scarborough (CA); Carl Alan Morris, Orlando, FL (US)

(73) Assignee: Teranex Systems, Inc., Orlando, FL (US)

( * ) Notice: Subject to any disclaimer, the term of this patent is extended or adjusted under 35 U.S.C. 154(b) by 289 days.

(21) Appl. No.: 11/210,042

(22) Filed: Aug. 23, 2005

(65) Prior Publication Data

US 2006/0044603 A1    Mar. 2, 2006

Related U.S. Application Data

(60) Provisional application No. 60/605,913, filed on Aug. 31, 2004.

(51) Int. Cl.
*G06F 13/00* (2006.01)
*G06F 12/06* (2006.01)
*G09G 5/36* (2006.01)

(52) U.S. Cl. .................. 345/537; 345/547; 345/571; 345/545

(58) Field of Classification Search .......... 345/545, 345/530, 531, 533, 544, 547, 537, 571, 572
See application file for complete search history.

(56) References Cited

U.S. PATENT DOCUMENTS

| 6,425,026 B1 * | 7/2002 | Morris et al. ............. 710/100 |
| 6,614,444 B1 | 9/2003 | Duluk, Jr. et al. |
| 6,927,776 B2 * | 8/2005 | Mino et al. ............... 345/538 |

* cited by examiner

*Primary Examiner*—Hau H Nguyen
(74) *Attorney, Agent, or Firm*—Allen, Dyer, Doppelt, Milbrath & Gilchrist, P.A.

(57) ABSTRACT

System and method for reading and writing pixel aligned subframes from a frame buffer in a parallel processing system are disclosed. Optimal bandwidth access of the frame buffer requires that data be moved in bursts having multiple data words. Subframes are specified at X and Y locations within the image frame with a resolution of one pixel. In addition, subframes within a row may overlap each other and consecutive subframe rows may also overlap. Memory control logic of the invention provides pixel packing and unpacking and storing selected pixel data in a cache memory. Reading and writing to the frame buffer is provided in a manner that makes optimal use of the frame buffer internal architecture. Other capabilities of the memory control logic include decimation of pixel data during input, suppression of redundant frame buffer writes, and accessing image frame data in an interlaced manner.

23 Claims, 8 Drawing Sheets

DDR Data Units

| Unit | Composition | Bytes |
|---|---|---|
| Bank segment | 2 Bursts | 64 |
| Burst | 2 physical words | 32 |
| Physical word (mem_dat) | 2 logical words | 16 |
| Logical word (64-bit) | 2, 3, 4 pixels | 8 |

Image Processing System

Packing Codes

| Packing Code | Pixel Size |
|---|---|
| 0 | Unused |
| 1 | 30/32 bit |
| 2 | 20 bit |
| 3 | 16 bit |

DDR Data Units

| Unit | Composition | Bytes |
|---|---|---|
| Bank segment | 2 Bursts | 64 |
| Burst | 2 physical words | 32 |
| Physical word (mem_dat) | 2 logical words | 16 |
| Logical word (64-bit) | 2, 3, 4 pixels | 8 | cache_cmd Definition

| Cache_Cmd | Definition |
|---|---|
| 0 | No caching |
| 1 | First subframe |
| 2 | Middle subframe |
| 3 | Final subframe |

Memory Organization for 8 Image Lines

| Line | Pair 0 | Pair 1 | Pair 2 | Pair 3 | Pair 4 | Pair 5 | Pair 6 | Pair 7 |
|---|---|---|---|---|---|---|---|---|
| 0 | A | B | C | D | A | B | C | D |
| 1 | A | B | C | D | A | B | C | D |
| 2 | A | B | C | D | A | B | C | D |
| 3 | A | B | C | D | A | B | C | D |
| 4 | A | B | C | D | A | B | C | D |
| 5 | A | B | C | D | A | B | C | D |
| 6 | A | B | C | D | A | B | C | D |
| 7 | A | B | C | D | A | B | C | D |

SIMD Array subframe

FIG. 11

Swizzled Memory Organization

| Line | Pair 0 | Pair 1 | Pair 2 | Pair 3 | Pair 4 | Pair 5 | Pair 6 | Pair 7 |
|---|---|---|---|---|---|---|---|---|
| 0 | A | B | C | D | A | B | C | D |
| 8 | D | A | B | C | D | A | B | C |
| 16 | C | D | A | B | C | D | A | B |
| 24 | B | C | D | A | B | C | D | A |
| 32 | A | B | C | D | A | B | C | D |
| 40 | D | A | B | C | D | A | B | C |
| 1 | C | D | A | B | C | D | A | B |
| 9 | B | C | D | A | B | C | D | A |

SIMD Array subframe

FIG. 12

Exemplary Subframe I/O Command

| Field | Units | Description |
|---|---|---|
| 22:00 | 32-byte | Frame Address |
| 23:23 | 1=Active | Decimation Cmd |
| 35:24 | Pixels | X Offset |
| 47:36 | Frame Lines (Pitch) | Y Offset |
| 53:48 | Pixels | Overlap |
| 59:54 | Subframe Lines | Y Lines (output only) |
| 61:60 | 0=no cache, 1=first subf, 2=norm subf, 3=last subf | Cache Cmd |
| 63:62 | Cache number | Cache Select |
| 65:64 | 0=unused, 1=30/32 bit, 2=20 bit, 3=16 bit | Pack Code |
| 66:66 | 0=out, 1=in | Input/Output direction |
| 75:67 | 32-byte | Pitch |
| 80:76 | Frame Lines (Pitch) | Stride |

FIG. 13

METHOD AND APPARATUS FOR READING AND WRITING PIXEL-ALIGNED SUBFRAMES IN A FRAME BUFFER

CROSS-REFERENCE TO RELATED APPLICATIONS

This application claims the benefit of U.S. Provisional Application No. 60/605,913, filed Aug. 31, 2004, the disclosure of which is hereby incorporated by reference herein in its entirety, and commonly owned.

FIELD OF THE INVENTION

This invention relates to SIMD parallel processing, and in particular, to executing instructions from an auxiliary data stream.

BACKGROUND OF THE INVENTION

Parallel processing architectures, employing the highest degrees of parallelism, are those following the Single Instruction Multiple Data (SIMD) approach and employing the simplest feasible Processing Element (PE) structure: a single-bit arithmetic processor. While each PE has very low processing throughput, the simplicity of the PE logic supports the construction of processor arrays with a very large number of PEs. Very high processing throughput is achieved by the combination of such a large number of PEs into SIMD processor arrays.

A variant of the bit-serial SIMD architecture is one for which the PEs are connected as a 2-D mesh, with each PE communicating with its 4 neighbors to the immediate north, south, east and west in the array. This 2-d structure is well suited, though not limited to, processing of data that has a 2-d structure, such as image pixel data.

SUMMARY OF THE INVENTION

The present invention in one aspect provides a digital data processing system that may comprise a source of data, adapted to provide pixel data representing an image frame line segment, said line segment comprising at least one data block containing pixels arranged in a raster order; means for receiving the line segment and selecting pixel values from the line segment, wherein the selected pixels comprise a raster order pixel group; and means for constructing a subframe line from the raster order pixel group, said subframe line comprising at least one data word containing at least 2 pixels arranged in a raster order.

In another aspect, the present invention provides a digital data processing system that may comprise a data client, adapted to receive pixel data representing an image frame line segment, said line segment comprising at least one data block containing pixels arranged in a raster order; means for receiving a subframe line comprising at least one data word containing at least 2 pixels arranged in a raster order, and selecting pixel values from the subframe line, wherein the selected pixels comprise a raster order pixel group; and means for constructing a line segment from the raster order pixel group and conveying the line segment to said data client.

Various aspects and embodiments of the invention are revealed in the following description along with the accompanying drawings.

BRIEF DESCRIPTION OF THE DRAWINGS

For a fuller understanding of the invention, reference is made to the following detailed description, taken in connection with the accompanying drawings illustrating various embodiments of the present invention, in which:

FIG. 11 is a table showing the bank sequence for burst pairs associated with a subframe;

FIG. 12 is a table showing the bank sequence for burst pairs associated with a subframe where swizzling is employed; and FIG. 13 is a table listing and defining the components of the subframe I/O command.

DETAILED DESCRIPTION OF THE PREFERRED EMBODIMENTS

The present invention relates to parallel processing of digital data, and in particular, digital image pixel data. Although the embodiments disclosed herein relate to the particular case of image pixel data, it should be understood that pixel data could be replaced with any digital data without departing from the scope and spirit of this invention.

Figure 1A:
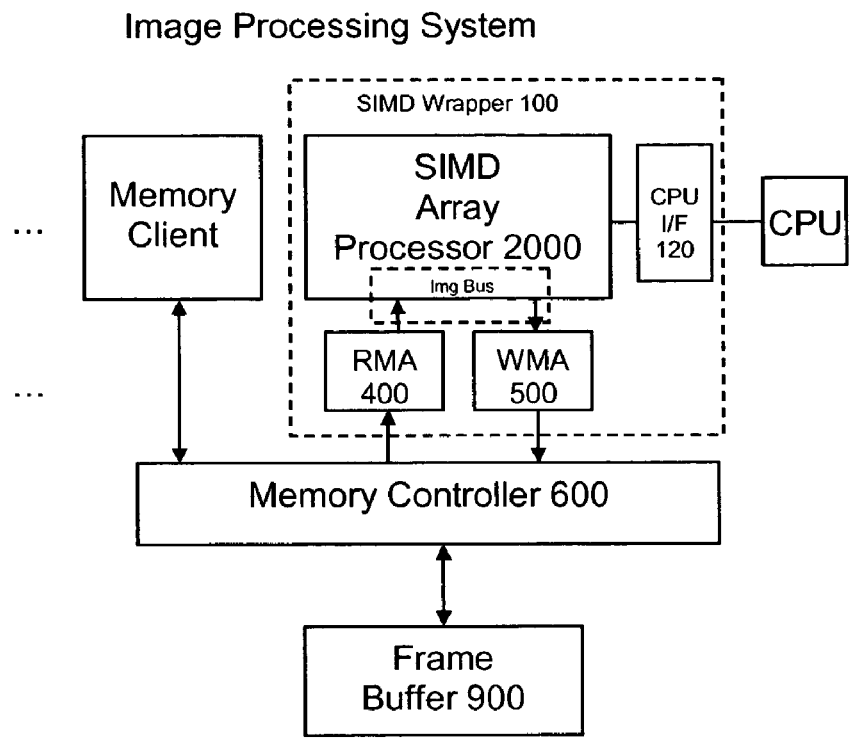
FIG. 1A is a schematic diagram of an image processing system built in accordance with the present invention.

The exemplary embodiment of the present invention is part of an image processing system used primarily for processing pixel data. Referring to FIG. 1A, an exemplary system built in accordance with the present invention comprises SIMD array processor 2000, SIMD wrapper 100, memory controller 600 and frame buffer 900. SIMD array processor 2000 provides processing of pixel data. SIMD wrapper 100 encapsulates the SIMD array processor, providing interfaces to other elements of the system. SIMD wrapper 100 also incorporates many of the functional aspects of the invention. Memory controller 600 provides direct control of data reads and writes between the system and frame buffer 900. Frame buffer 900 provides storage of image frame data for processing by the image processing system.

Figure 1B:
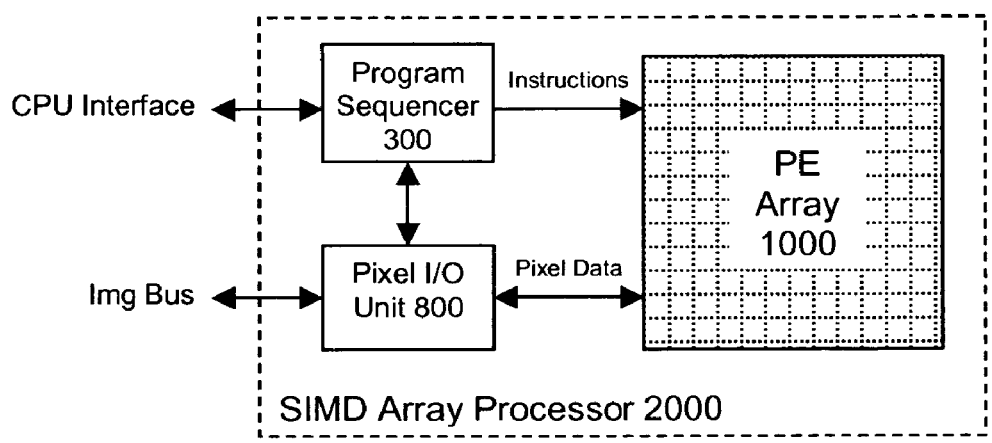
FIG. 1B is a schematic diagram of a SIMD array processor built in accordance to the present invention.

Referring now to FIG. 1B, SIMD array processor 2000 provides the computation logic for performing operations on pixel data. Pixel operations are performed on a SIMD (Single Instruction Multiple Data) array of processing elements (PEs). To perform these operations, the PE array 1000 requires a source of instructions and support for moving pixel data in and out of the array.

SIMD array processor 2000 includes a program sequencer 300 to provide the stream of instructions to PE array 1000. Pixel I/O unit 800 is also provided for the purpose of controlling the movement of pixel data in and out of the PE array 1000.

The SIMD array processor 2000 may be employed to perform computations on array-sized image segments. The array dimensions for one exemplary embodiment are 64 columns by 48 rows. SIMD array processor 2000 is subordinate to a system control processor, referred to herein as the "CPU". CPU I/F 120, as shown in FIG. 1A, interfaces between the SIMD array processor 2000 and the CPU and provides for initialization and control of the exemplary SIMD array processor 2000 by the CPU.

The pixel I/O unit 800 provides control for moving pixel data between the PE array 1000 and external storage via an image buss called "Img Bus". The movement of pixel data is performed concurrently with PE array computations, thereby providing greater throughput for processing of pixel data. The pixel I/O unit 800 performs a conversion of image data between the packed frame buffer pixel form and the form required for processing by the PE array 1000.

The SIMD array processor 2000 processes image data in array-sized segments known as "subframes". In a typical scenario, the image frame in frame buffer 900 is much larger than the dimensions of PE array 1000. Processing of the image frame is accomplished by processing subframe image segments in turn until the image frame is fully processed.

In an exemplary system employing the SIMD array processor 2000, frame buffer 900 provides storage for image data external to the SIMD array processor 2000. Frame buffer 900 communicates with the SIMD array processor 2000 via the Img Bus interface within SIMD wrapper 100. To meet bandwidth requirements, the width of the Img Bus interface is 64-bits. Frame buffer 900 is organized such that data words are logically 64-bit in width.

Figures 2, 3:
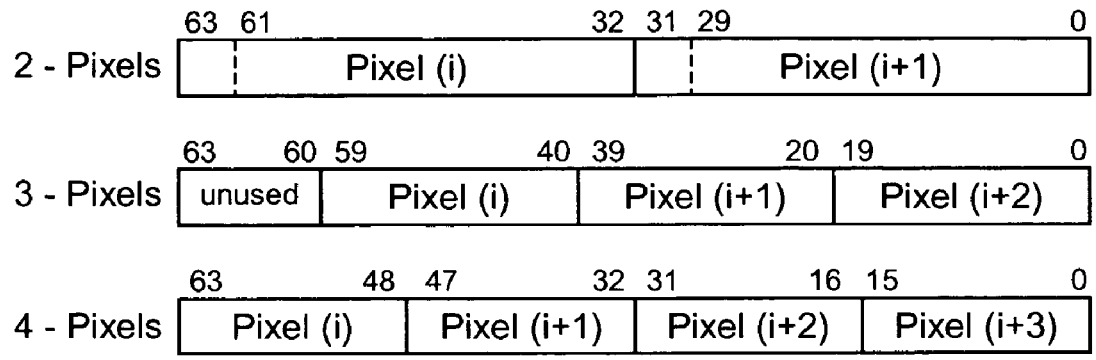
FIG. 2 is a graphical representation of the storage format for pixel data in the frame buffer.
FIG. 3 is a table showing the definition of the packing code control signal.

Pixel data is stored in 64-bit multi-pixel words, as shown in FIG. 2. Many packing formats are supported, for instance, 2 pixels per word (30- or 32-bit pixel data), 3 pixels per word (20-bit), and 4 pixels per word (16-bit). The packing format is represented by a packing code as shown in FIG. 3.

Pixels are packed in consecutive horizontal scan order. Within the data word, earlier pixels are located toward the most significant end of the word. Pixels are aligned with bit 0, the least significant end of the word, so any unused bits are at the most significant end.

During input and output of subframe data, the data words are moved in horizontal scan line order. Therefore, a pixel at the least significant end of a data word is followed by the next pixel in the image frame, which is stored toward the most significant end of the next data word in the sequence.

The first data word for each subframe line, as processed by SIMD array processor 2000, is aligned so that the first pixel of the subframe line is the first pixel of the data word. That is, a subframe line does not begin in the middle of a data word. This alignment could be achieved by restricting the granularity of subframe boundaries to multiple-of-2, -3 or -4 pixels (depending on pixel packing) within frame buffer 900. Alternatively, as in the exemplary embodiment, SIMD wrapper logic may perform a pixel re-packing function to ensure the alignment of each subframe line.

Within frame buffer 900, pixel packing is "justified" at the beginning of each image frame line, that is, the first pixel for each line is stored at the most significant end of the first data word for that frame line. Frame lines are also aligned at 32-byte (4 word) burst boundaries in this exemplary embodiment. Because of this alignment, some unused data may occur at the end of each frame line.

The pixel packing method described here is the one followed for one exemplary embodiment. Other pixel orders and storage constraints might be applied within the overall data handling scheme described without departing from the scope of the present invention.

Figure 4:
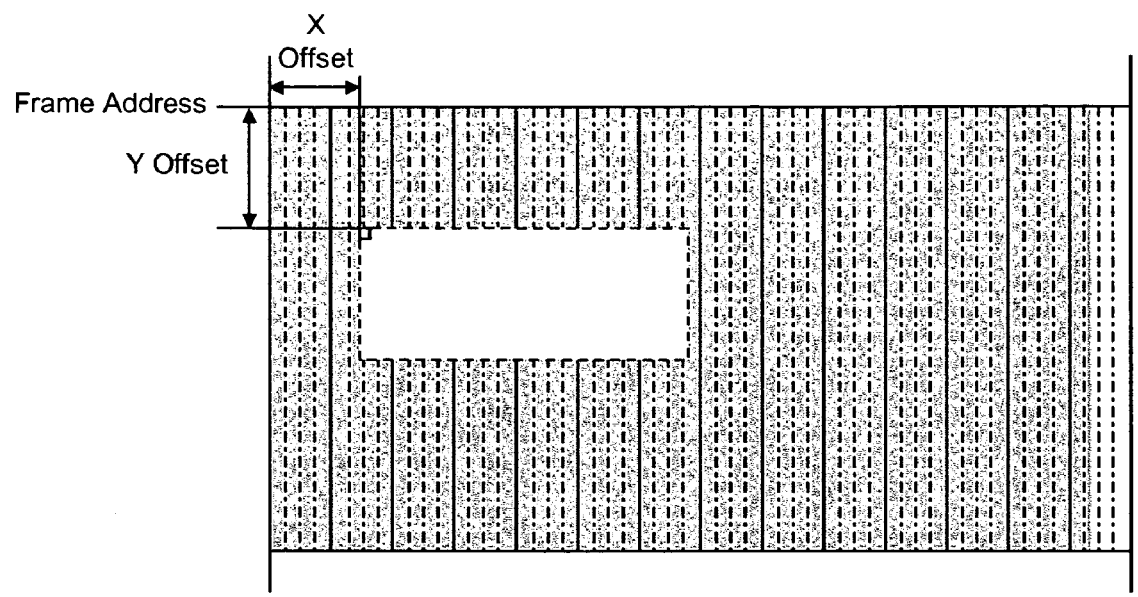
FIG. 4 is a graphical representation of the location and selection of a subframe within an image frame stored in the frame buffer.

An example of image frame storage is shown in FIG. 4. In this example, the image frame, shown by the shaded area, comprises 160×160 pixels. The packing code is 2 (explained above), specifying 20-bit pixels. A single 48×64 subframe, shown as a white rectangle with dashed perimeter, is arbitrarily located at an X Offset of 17 and a Y Offset of 40.

In the figure, 64-bit word boundaries are shown by dashed vertical lines and bursts (consisting of 4 words each) are shown by solid vertical lines. Since there are 3 pixels per word in this example, a burst consists of 12 pixels. A frame line of 160 pixels therefore requires 14 bursts (160/12=13 ⅓). As shown by the shaded area, only ⅓ of the final burst is used for image frame data. The "pitch" for the frame is expressed as the number of bursts for each frame line, i.e. 14 in this example.

For most purposes, the image frame is completely specified by the frame address, packing code and pitch values. The exemplary subframe is located at a Y offset of 40 and an X offset of 17. The X offset and Y offset values represent the position of the upper left corner of the subframe with respect to the start address (upper left corner) of the image frame. The offsets are in terms of pixels, with the X offset increasing from left to right and the Y offset increasing from top to bottom.

The exemplary SIMD array processor 2000 processes 48×64 image segments known as subframes. All image data input and output is in terms of subframes. An image frame is therefore processed by processing subframe segments in turn until the entire image frame is completed.

Figure 5:
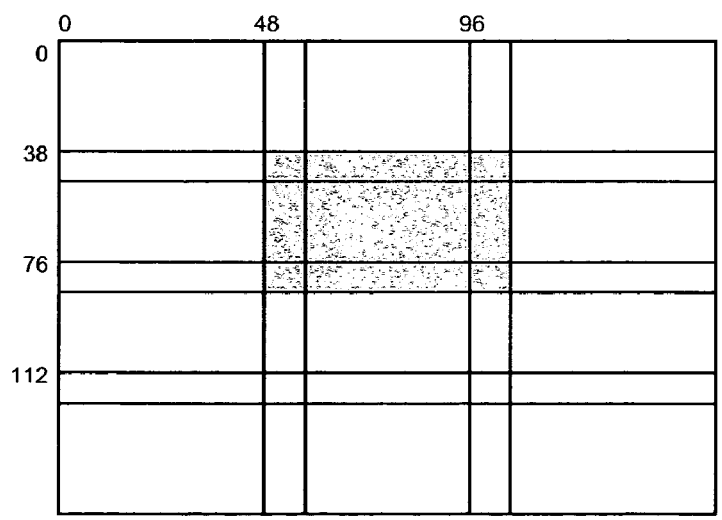
FIG. 5 is a graphical representation of overlapping subframes within an image frame.

For the example of the 160×160 image frame, the subframing pattern shown in FIG. 5 might be employed. It may be seen that the subframes overlap each other. This is a necessary consequence of the fact that the 64-wide subframes do not evenly span the 160-wide frame, nor do the 48-high subframes evenly span the 160-high frame. In practice, overlap of subframes is also necessary to remove pixels that are invalid due to edge effects introduced by processing.

In the example of FIG. 5, the shaded subframe would be identified by an X Offset of 48 and a Y Offset of 38. Assuming raster order processing, the final 10 lines of this subframe will subsequently be overwritten by a later subframe. The writing of these 10 lines to frame buffer 900 is therefore redundant. To prevent these redundant writes, a "Y-lines" parameter of 38 may be specified. The parameter Y-lines determines the number of subframe lines to be written to frame buffer 900 during a subframe output. Any write of subframe lines beyond the Y-lines number is suppressed by SIMD wrapper 100.

Processing of interlaced subframes is sometimes necessary, where subframes for one field are composed of even frame lines only, and subframes for another field are composed of odd frame lines only. A "stride" parameter allows the programmer to specify an offset—in terms of image frame lines—between subframe lines. In one exemplary embodiment, the stride may be any value from 0 to 31, though 1 (non-interlaced) and 2 (interlaced) are the normal alternatives.

A decimation feature provides increased throughput for subframe input. A "Dec_cmd" parameter determines whether decimation is active (1) or inactive (0). Decimation is applied to 20-bit pixel data only. The decimation method combines 3 pixel values, producing a single 20-bit pixel by the following formula:

$$Pixel_i = (word_i[59:40]*20 + word_i[39:20]*24 + word_i[19:0]*20)/64$$

Decimation is applied on a word basis, with the 3 pixels of each 64-bit word being combined to produce a single subframe pixel. The X Offset in frame buffer 900 must be at a word boundary. The subframe read from frame buffer 900 is effectively 48×192 pixels in size, while the subframe received by the SIMD array processor 2000 is a normal 48×64 subframe. No cache support is provided for decimated subframe input.

A subframe is completely specified by an X Offset, a Y Offset, Y Lines, stride and the Dec_cmd parameter.

Figure 9:
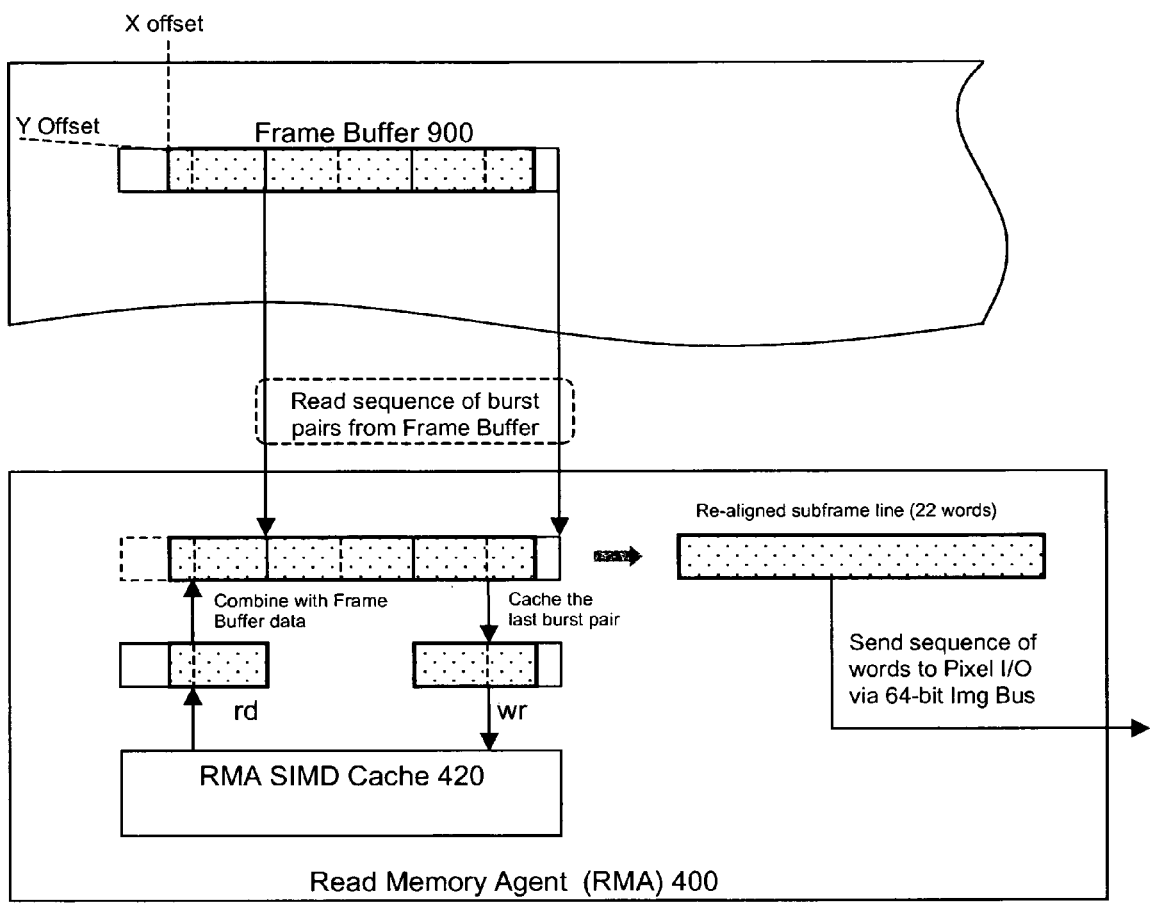
FIG. 9 is a graphical representation showing the use of the RMA SIMD cache to construct subframe lines.
Figure 10:
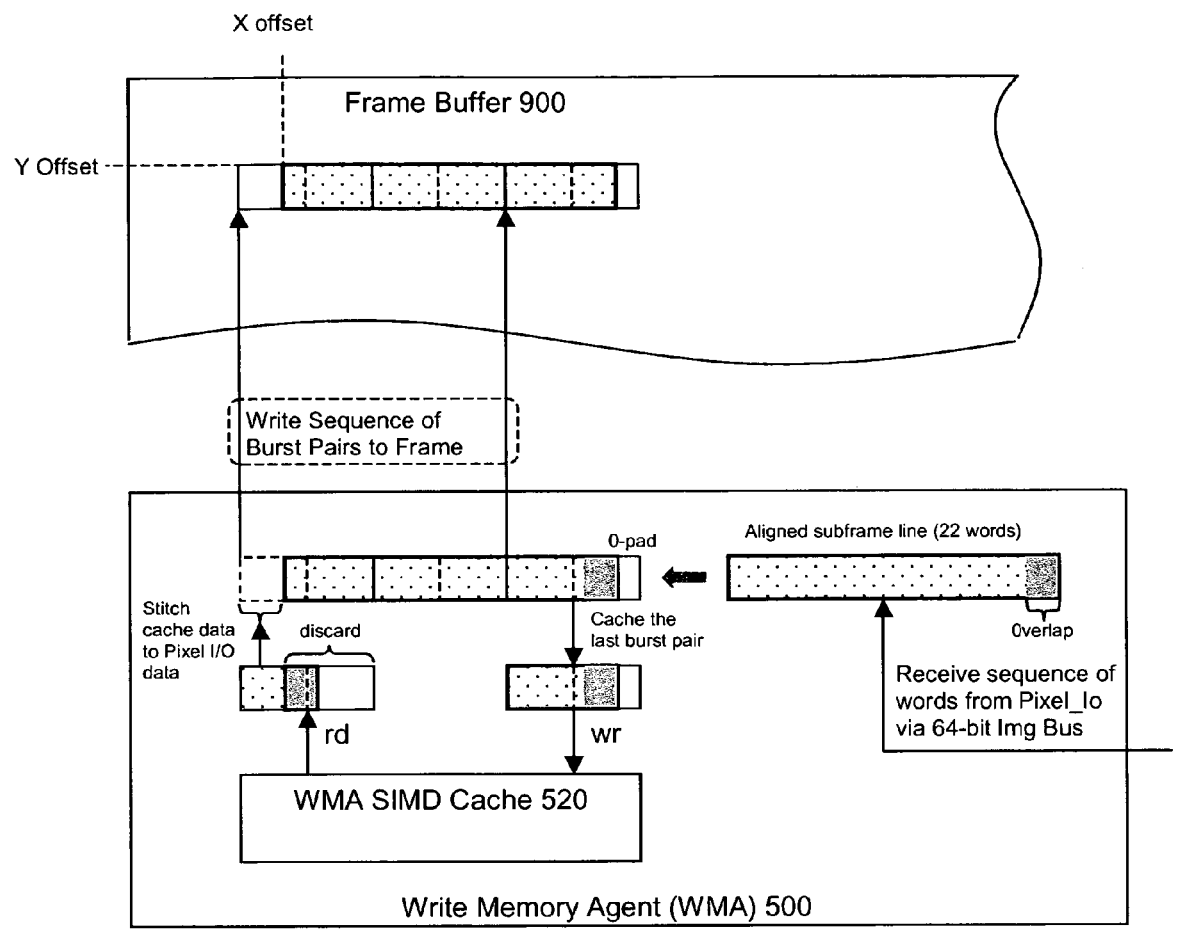
FIG. 10 is a graphical representation showing the use of the WMA SIMD cache to construct frame buffer burst pairs.

Referring now to the exemplary embodiments of FIG. 9 and FIG. 10, SIMD wrapper 100 provides control and temporary data storage for the purpose of transferring pixel data between frame buffer 900 and the SIMD array processor 2000 during subframe I/O. Read memory agent (RMA) 400 controls the transfer of data from frame buffer 900 to SIMD array processor 2000, employing the RMA SIMD cache 420 if requested, and constructing a realigned subframe line for transfer via the Img Bus. Write memory agent (WMA) 500 controls transfer of data from SIMD array processor 2000 to frame buffer 900, employing the WMA SIMD cache 520 for stitching, and constructing a frame buffer-aligned data stream for write to frame buffer 900.

Figures 6, 7, 8:
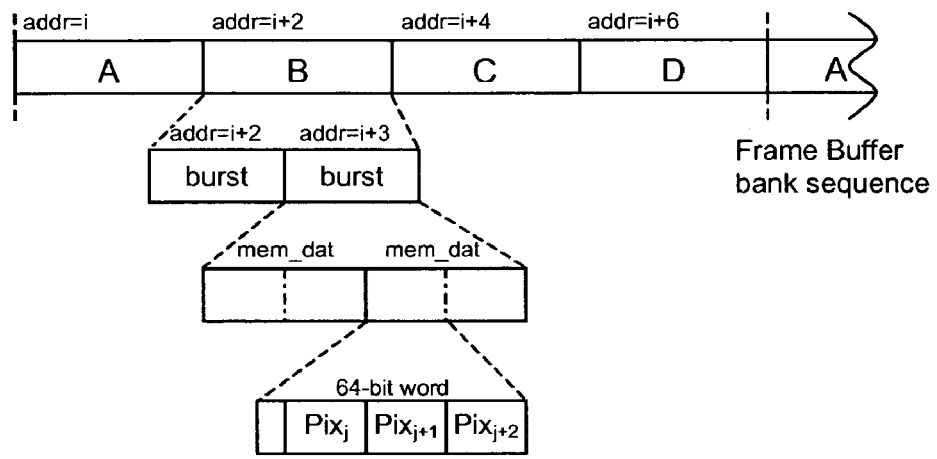
FIG. 6 is a table listing the terminology and composition describing the units of data stored in the frame buffer.
FIG. 7 is a graphical representation of the data units listed in FIG. 6, showing frame buffer storage and bank sequence.
FIG. 8 is a table showing the definition of the cache_cmd control signal.

The exemplary embodiment employs a DDR (double data rate) memory for its frame buffer. The physical data path for the DDR is 128 bits wide. The physical addressing of the DDR memory is in terms of bursts. Each burst is a 32-byte data block, comprising 2 physical words (i.e. 2 data transfers as propagated on a data buss called "mem_dat"). Each physical word comprises 2 logical words, i.e. 64-bit data words as described in previous sections of this document. A summary of these data units is shown in FIG. 6 and FIG. 7.

The exemplary DDR memory is internally partitioned into 4 banks, labeled A, B, C and D. The bank structure is such that a sequence of addresses traverses a bank segment for each count of 2 in the sequence. In other words, address 0 and 1 refer to bank A, 2 and 3 refer to bank B, and so on as shown in FIG. 7.

For optimal performance, a couple of rules are followed. The first is to access burst pairs that belong to the same bank in sequence. So, a read of address 0 should be followed by a read of address 1 and so on. The second rule is that access of a burst pair from one bank should be followed by an access of a burst pair from the next bank. In general, banks must be accessed in sequence for optimal performance. As long as addresses are accessed in sequence, optimal memory performance may be maintained. Accesses to addresses that are not in sequence may still be performed optimally as long as the banks are accessed in sequence. So, the burst pair of addresses 2, 3 (bank B) might be followed by burst pair of addresses 12, 13 (bank C) without incurring a performance penalty.

Each of the memory agents employs a SIMD cache to reduce redundant frame buffer transfers and, in the case of the WMA, to provide for stitching of output data. In an exemplary embodiment, each SIMD cache may support up to 4 active subframe I/O processes. Each of these "logical caches" provides 3 k bytes of storage, for a total of 12 k bytes per cache. A logical cache stores 2 bursts for each of the 48 lines of a subframe. The exemplary RMA SIMD cache 420 is configured as a 128×768 RAM and the exemplary WMA SIMD cache 520 is configured as a 64×1536 RAM.

During subframe I/O, a SIMD cache is written with the final 2 bursts for each subframe line. (This burst pair is constrained to being an even-odd pair, thereby belonging to the same DDR bank.) The data written to the SIMD cache during transfer of a given subframe is read and used by the cache during transfer of the next subframe for a given image frame. To make proper use of the cache, subframes must be transferred in raster sequence so that the data written to the cache from a given subframe may be read from the cache and employed for the transfer of the next subframe in sequence.

Use of the WMA SIMD cache 520 is required for subframe output, in order to perform stitching. Use of the RMA SIMD cache 420 for subframe input is optional, though its use provides a performance benefit. For the first subframe of a given subframe row, no read of the SIMD cache is performed since there is no previous subframe within the row to provide data. For this subframe, only a cache write is performed. For the last subframe of a subframe row, there is no cache write, since there is no subsequent subframe to use the data. For this subframe, only a cache read is performed. For all "middle" subframes, both read and write of the SIMD cache is performed.

Each subframe I/O task includes a cache_cmd control and a cache_select control. The cache_cmd determines whether to treat the subframe as a "first" subframe (1), a "middle" subframe (2), a "final" subframe (3) or to perform no caching at all (0). The cache_select determines which of the logical caches, 0 through 3, to employ for the subframe I/O task.

RMA 400 encapsulates the data alignment logic, control, and RMA SIMD cache 420 required to transfer subframe data from frame buffer 900 to the SIMD array processor 2000. The operation of RMA 400 is illustrated by an example shown in FIG. 9. This example illustrates the read of a subframe line for 20-bit data. The subframe is assumed to be a "middle" or normal subframe so that both read and write access of the SIMD cache is performed.

The first subframe line for this subframe is shown at the specified X and Y offsets in frame buffer 900. The shaded portion of the line represents the pixel data to be read. Since this is 20-bit data, it spans most of 3 burst pairs. The outer rectangle shown represents the 3 burst pairs, with dashed lines indicating the boundaries of each burst. It may be observed that the subframe line might span portions of 4 burst pairs if it were located differently with respect to the burst pairs.

Since this is assumed to be a middle subframe, the first burst pair for each line resides in RMA SIMD cache 420 and need not be read from frame buffer 900. In this example, therefore, only 2 burst pairs for each subframe line need be read.

As each subframe line is read from frame buffer 900, the corresponding entry in the SIMD cache is read and combined with frame buffer 900 data to provide all 3 burst pairs that contain the subframe line. When the final burst pair for the subframe line has been read from frame buffer 900, it is written to the SIMD cache.

The reconstructed subframe line is re-aligned so that 22 words of 64-bit packed pixels are created. The data is aligned so that the first pixel of the subframe line is justified at the most significant end of the first word as shown in FIG. 9. This is the alignment required by the SIMD array processor 2000. The 22 words are sent to the pixel I/O unit 800 of the SIMD array processor 2000 in raster sequence.

If the subframe line in this example were for a "first" subframe (or if cache_cmd=0 indicating no caching), there would be no cache data to combine with frame buffer data. It would be necessary to read all 3 burst pairs from frame buffer 900 and create the re-aligned subframe line to be sent to the pixel I/O unit 800. If the subframe line were for a "final" subframe, the write of data to the SIMD cache would simply be omitted.

It should be apparent that the SIMD cache address for the read and write accesses for a given subframe line will be the same, since the same logical cache and subframe line is indicated for each. The new cache (write) data replaces the old (read) data as the old data is being used to construct the subframe line. Since the read occurs at the beginning of the subframe line and the write occurs at the end of the line, there is no memory access conflict or read-write order violation.

WMA 500 encapsulates the data alignment logic, control, and WMA SIMD cache 520 required to transfer subframe data to frame buffer 900 from the SIMD array processor 2000. The operation of the WMA is illustrated by an example shown in FIG. 10. This example illustrates the write of a subframe line for 20-bit data. The subframe is assumed to be a "middle" or normal subframe so that both read and write of the SIMD cache is performed.

The destination for the first subframe line is shown at the specified X and Y offsets in frame buffer 900. The shaded portion of the line represents the pixel data to be written. Since this is 20-bit data, it spans most of 3 burst pairs. The outer rectangle shown represents the 3 burst pairs, with dashed lines indicating the boundaries of each burst.

As each subframe line is received in raster sequence from the pixel I/O unit, the data is re-aligned so that the data is properly located within the burst pairs to be written to frame buffer 900. This re-alignment may result in unused data in the final burst pair, which is zero-padded. The final burst pair of the re-aligned data is written to the WMA SIMD cache 520 for use by the next subframe. The final burst pair is not written to frame buffer 900 at this time.

Data that makes up the first burst pair to be written to frame buffer 900 includes data that precedes the starting point of the current subframe line. In the absence of a cache, this data would have to be read from frame buffer 900 and "stitched" to the subframe line to create a valid first burst pair. However, WMA SIMD cache 520 uses the cached data from the previous subframe to provide this data. The burst pair is read from the SIMD cache and the portion of it preceding the subframe line start is extracted and joined (or stitched) to the subframe line data to produce the first burst pair. In the example, the first two burst pairs of the re-aligned data will be written to frame buffer 900.

In o respect, WMA 500 differs from RMA 400 in this example of the present invention, in the treatment of subframe overlap. The overlap of subframes to allow elimination of edge effects was described previously in this disclosure. For subframe input, the overlap is handled simply by specifying the X and Y offsets for the desired subframe to read, regardless the position of the previous subframe. For subframe output, however, it is necessary for the WMA 500 to know the overlap so that it can determine the portion of the current subframe that is valid.

An output subframe must be positioned in frame buffer 900 so that the leading edge abuts the trailing edge of the previous subframe. The trailing edge of the previous subframe can only be determined if the overlap is known. For example, a subframe that starts at X offset of 100 and has an overlap of 10 will have a trailing edge at 100+64−10−1, or 153. The next subframe that is output must be written to an X offset of 100+64−10, or 154. Since the X offset is programmer supplied, the positioning of the next subframe is not a problem.

However, WMA 500 has the explicit responsibility of stitching data to the leading edge of a subframe, whatever its X offset is. It can only do this if it has the correct data in the cache. WMA 500 must know the overlap to determine where the trailing edge of the current subframe is so that it will know which burst pair to write to cache for stitching the next subframe.

In the example shown, the overlap does not affect the determination of which burst pair to write. However, in the general case it is possible that the trailing edge of the full subframe falls in a different burst pair from the trailing edge of the subframe after adjustment for overlap.

If the subframe line in this example were for a "first" subframe (or if cache_cmd=0 indicates no caching), there would be no cache data to combine with the subframe line. Since the frame address and pitch for an image frame are constrained to be at burst pair boundaries, the first subframe of a subframe row is always burst-pair aligned, and therefore requires no stitching.

If the subframe line were for a "final" subframe, the write of data to the SIMD cache would simply be omitted, since there are no further subframes in the row to require data for stitching. The final burst pair is written to frame buffer 900.

To perform this example with different pixel sizes, it is necessary only to observe that the number of words for each subframe line will change (16 words for 16-bit data, 32 words for 32-bit data), affecting the number of burst pairs per subframe line. The memory control logic and re-alignment functions must take pixel size into consideration to produce the correct re-aligned subframe line.

Memory controller 600 provides direct control of frame buffer accesses by the image processing system in response to requests by clients within the system. SIMD wrapper 100 is one of several clients serviced by memory controller 600.

The frame buffer address provided by the RMA 400 or WMA 500 is computed based upon the subframe parameters as follows:

FB Addr=floor(X_offset/(pixels_per_word*4))+
(Y_offset*Pitch)+Frame Address WMA uses
"even_floor" instead of "floor" to provide burst
pair alignment As mentioned previously, optimal performance requires that frame buffer 900 be accessed in bank order. For most clients, a normal raster ordering for data storage insures that this will occur. For example, the first 8 lines of an image spanning 8 burst pairs per line are shown in FIG. 11. Access of this image will yield the desired A-B-C-D bank order.

Use of this memory organization would produce less-than-optimal results for a SIMD array image, however. One reason is that the portion of a subframe line that is required for a sequence of accesses (i.e. the subframe line less the cached data) is often less than 4 burst pairs. If the gray portion of FIG. 12 represents the first 8 lines of a SIMD array image, one can see that the sequence of accesses would be A-B-C-A-B-C instead of A-B-C-D. Since the C-A bank sequence is out of order, a wait state would be inserted for each occurrence of this sequence.

To eliminate loss of performance due to wait states, a technique known as "swizzling" is employed. Swizzled data is data that is written to frame buffer 900 with a non-sequential ordering such that accesses by the SIMD array processor 2000 will result in sequential bank accesses. Due to requirements that are peculiar to the SIMD array processor 2000, subframe lines are accessed in a pattern of multiple-of-8 lines. Given this requirement, a swizzle pattern that would result in the desired order of bank accesses for a stride of 1 is shown in FIG. 12. It may be seen that as the subframe lines are accessed in order (0, 8, 16, etc.), the bank sequence of A-B-C-D is maintained throughout.

During an access by a client, the memory controller 600 is told whether the data to be accessed is swizzled. For the memory controller 600, handling of swizzled data is an exercise in address generation. For normal (non-swizzled) data, the frame buffer address can be computed:

ADR[27:0]=BASE_ADR+Y*PITCH+X where Y is the Y offset and X is the X offset in burst units For access of swizzled data, the address is computed as the following:

```
        ORIG_ADR = BASE_ADR + Y * PITCH + X
ORIG_BANK = ORIG_ADR[7:6]
if (BANK_SWIZZLE_EN=1) then
    if (STRIDE=1) then
        Y_LINE = Y[4:3]
    elsif (STRIDE=2) then
        Y_LINE = Y[5:4]
    elsif (STRIDE=4) then
        Y_LINE = Y[6:5]
    elsif (STRIDE=8) then
        Y_LINE = Y[7:6]
    elsif (STRIDE=16) then
        Y_LINE = Y[8:7]
    endif
else
    Y_LINE = O
endif
if (Y LINE=1) then
    BANK = ORIG_BANK+3
elsif (Y_LINE=2) then
    BANK = ORIG_BANK+2
elsif (Y_LINE=3) then
    BANK = ORIG_BANK+1
else
    BANK = ORIG_BANK
endif
ADR[27:5] = ORIG_ADR[27:8] & BANK & ORIG_ADDR[5]
```

It may be seen that only power-of-2 Stride values are supported with swizzling.

A subframe I/O task is described by a subframe I/O command as shown in FIG. 13. SIMD array processor 2000 dispatches a subframe I/O command to SIMD wrapper 100 to signify the beginning of a subframe input/output task. The I/O command provides information completely specifying the frame from which the subframe is to be taken, the subframe itself, and the cache controls to be employed.

The I/O direction field (bit 66 in FIG. 13) determines whether the task is for input (dir=1) or output (dir=0) of a subframe. Direction is with respect to the SIMD array processor 2000.

The image frame is specified by the frame address, pitch and pack code parameters. The frame address provides the base address for the image frame in frame buffer 900. The pack code determines whether a word contains two 30/32-bit pixels (pack=1), three 20-bit pixels (pack=2) or four 16-bit pixels (pack=3). The storage required for a frame line is determined by the width of the frame (in pixels) and the packing of the pixels into words. The line width is expressed as the pitch for the image frame. Units for frame address and pitch are 32-byte bursts.

The subframe is specified by the X offset, Y offset, Y lines, stride and Dec_cmd parameters. The X offset and Y offset determine the X (column) and Y (row) position of the subframe within the frame. The X and Y offsets are expressed in units of single pixels. Numbering within the image frame is from the upper left-hand corner (row 0, column 0). Where the task is an output, the Y Lines parameter may be used to specify the number of subframe lines to write. To support interleaved storage of subframe data, a stride parameter is provided to determine a Y offset between each subframe line in the image frame. Although Stride would normally be 1 (non-interleaved) or 2 (interleaved), valid stride values range from 0 to 31. It should be noted that a stride of 0 would support generation of a vertical stripe pattern from a single subframe line of data in frame buffer 900. The Dec_Cmd determines whether decimation is to be employed during subframe input (0=no, 1=yes). Decimation is used for subframe input only, for 20-bit pixel data only and may only be applied at a word-aligned X offset.

The cache_select parameter determines which of the 4 cache buffers to use for the subframe task. The cache_cmd determines whether to use no caching (0) or to treat the subframe as a "first" subframe (1), a middle or "normal" subframe (2) or a "last" subframe (3). The Overlap value expresses the number of pixels of horizontal overlap between the current subframe and the next subframe in the sequence.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital data processing system comprising:
    a source of data, adapted to provide pixel data representing an image frame line segment, said line segment comprising at least one data block containing pixels arranged in a raster order, wherein the data source is a memory adapted to store image frames and wherein each data block is of fixed size and contains a selectable number of pixels;
    means for receiving the line segment and selecting pixel values from the line segment, wherein the selected pixels comprise a raster order pixel group;
    means for constructing a subframe line from the raster order pixel group, said subframe line comprising at least one data word containing at least 2 pixels arranged in a raster order;
    packing control means to determine the number of pixels comprising each data block;
    base address control means for specifying the base address of an image frame;
    means for specifying a pitch of said image frame, the pitch representing the address offset between corresponding pixels of consecutive image frame lines;
    means for specifying an image frame line number; and
    means for computing the start address of the image frame line in response to the base address control means, the packing control means, the image pitch, and the image frame line number.

2. The system of claim 1, wherein each data word is of fixed size and contains a selectable number of pixels, said system further comprising means to determine the number of pixels comprising each data word.

3. The system of claim 1, further comprising means for selecting two or more pixels from said at least one data block, said system adapted to generate a single pixel to be incorporated into said subframe line in response to the two or more selected pixel values.

4. The system of claim 1, wherein a final data block for each line segment contains pixels to be incorporated into said subframe line and pixels to be incorporated into a subsequent subframe line, said system further comprising:
    cache storage for storing the final data block; and
    means for reading the final data block from the cache storage in lieu of receiving a second copy of the final data block from the data source during construction of said subsequent subframe line.

5. The system of claim 4, further comprising means for determining whether a read from the cache storage is to be performed.

6. The system of claim 4, further comprising means for determining whether a write to the cache storage is to be performed.

7. The system of claim 4, wherein the beginning of said subsequent subframe line overlaps the end of said subframe line, thereby duplicating at least one pixel value between the said subframe line and the subsequent subframe line, said system further comprising:
- overlap control means for determining the degree of overlap between said subframe line and the subsequent subframe line; and,
- selection means, coupled to and responsive to the overlap control means, adapted to select a data block of said line segment containing pixels that comprise the beginning of the subsequent subframe line, and further adapted to store the selected data block to the cache storage instead of said final data block.

8. The system of claim 1, further comprising means for specifying a pixel number representing the offset of a pixel from the beginning of an image frame line with single-pixel precision, said system further comprising means for computing the address of a data block containing said pixel in response to said image frame line start address and the pixel number.

9. The system of claim 1, further comprising means for accessing image frame lines in a non-consecutive order comprising N passes, each pass comprising the sequential access of image frame lines at an offset of N lines from each other, and each pass beginning at an offset of one frame line from the beginning point of the previous pass.

10. The system of claim 9, wherein N is 8.

11. The system of claim 1, wherein the memory is partitioned into banks and is adapted to provide sequential accesses without insertion of wait states when memory banks are accessed in sequence, said system further comprising means for storing image frame data to the memory in an ordering that permits sequential access of banks when consecutive line segments are accessed.

12. A digital data processing system comprising:
- a source of data, adapted to provide pixel data representing an image frame line segment, said line segment comprising at least one data block containing pixels arranged in a raster order, wherein the data source is a memory adapted to store image frames and wherein each data block is of fixed size and contains a selectable number of pixels;
- means for receiving the line segment and selecting pixel values from the line segment, wherein the selected pixels comprise a raster order pixel group;
- means for constructing a subframe line from the raster order pixel group, said subframe line comprising at least one data word containing at least 2 pixels arranged in a raster order;
- packing control means to determine the number of pixels comprising each data block;
- base address control means for specifying the base address of an image frame;
- means for specifying a pitch of said image frame, the pitch representing the address offset between corresponding pixels of consecutive image frame lines;
- means for specifying an image frame line number; and
- means for specifying a stride of an image field representing the number of lines of the image frame separating each line to be incorporated into the image field.

13. The system of claim 12, further comprising means for specifying an image field line number, and further comprising means for computing the start address of the image field line in response to base address control means, the packing control means, the image pitch, the stride, and the image field line number.

14. The system of claim 13, further comprising means for specifying a pixel number representing the offset of a pixel from the beginning of an image field line said offset having single-pixel precision, said system further comprising means for computing the address of a data block containing said pixel in response to said image field line start address and the pixel number.

15. A digital data processing system comprising:
- a data client, adapted to receive pixel data representing an image frame line segment, wherein the data client is a memory adapted to store image frames, said line segment comprising at least one data block containing pixels arranged in a raster order, wherein each data block is of fixed size and contains a selectable number of pixels;
- means for receiving a subframe line comprising at least one data word containing at least 2 pixels arranged in a raster order, and selecting pixel values from the subframe line, wherein the selected pixels comprise a raster order pixel group;
- means for constructing a line segment from the raster order pixel group and conveying the line segment to said data client;
- base address control means for specifying the base address of an image frame;
- packing control means to determine the number of pixels comprising each data block;
- means for specifying a pitch of said image frame, said pitch representing the address offset between corresponding pixels of consecutive image frame lines; and
- means for storing a sequence of line segments to said memory, said sequence comprising a subframe representing a rectangular image segment of fixed dimensions positioned within the image frame at selectable line and pixel offsets from the image frame base address, said pixel offsets having single-pixel precision.

16. The system of claim 15, wherein each data block is of fixed size and contains a selectable number of pixels, said system further comprising means to determine the number of pixels comprising each data block.

17. The system of claim 15 wherein each data word is of fixed size and contains a selectable number of pixels, said system further comprising means to determine the number of pixels comprising each data word.

18. The system of claim 15 wherein a final data block for each line segment contains pixels to be selected from said subframe line and pixels to be selected from a subsequent subframe line, said system further comprising:
- cache storage for storing a partially constructed copy of the final data block during processing of said subframe line;
- means for reading the final data block copy from the cache storage and completing construction of said final data block during processing of said subsequent subframe line.

19. The system of claim 18 further comprising means for determining whether a read from the cache storage is to be performed.

20. The system of claim 18 further comprising means for determining whether a write to the cache storage is to be performed.

21. The system of claim 18 wherein the beginning of said subsequent subframe line overlaps the end of said subframe line, thereby duplicating at least one pixel value between said subframe line and the subsequent subframe line, said system further comprising:

overlap control means for determining the degree of overlap between said subframe line and the subsequent subframe line; and, selection means, coupled to and responsive to said overlap control means, adapted to select a data block of said line segment containing pixels that comprise the beginning of the subsequent subframe line, and further adapted to store the selected data block to the cache storage instead of said final data block.

22. The system of claim 15, further comprising means to determine a number of subframe lines to be written to said memory.

23. The system of claim 15, wherein the memory is partitioned into banks and is adapted to provide sequential accesses without insertion of wait states when memory banks are accessed in sequence, said system further comprising means for storing image frame data to the memory in an ordering that permits sequential access of banks when consecutive line segments are accessed.

* * * * *